United States Patent Office …

2,938,041
Patented May 24, 1960

2,938,041

N - GUANIDO - N' - THIOUREIDO - p - QUINONE-DIIMIDE, THE CORRESPONDING PHENYLENE-DIAMINE DERIVATIVE AND CERTAIN SALTS AND HYDRATES

Siegfried Petersen, Leverkusen-Schlebusch, and Gerhard Domagk, Wuppertal-Elberfeld, Germany, assignors to Schenley Industries Inc., New York, N.Y., a corporation of Delaware No Drawing. Filed Mar. 19, 1958, Ser. No. 722,369

5 Claims. (Cl. 260—396)

The invention relates to quinone condensation products and is a continuation-in-part of United States application Serial No. 400,093, filed December 23, 1953, now abandoned.

This invention more particularly relates to and has as its object the production of novel p-quinone condensation products having the general formula:

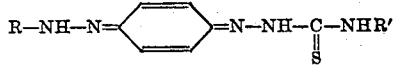

wherein R is a member of the group of

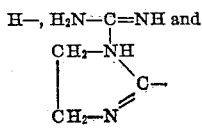

and R¹ is hydrogen, a lower alkyl radical containing up to four carbon atoms, a benzyl radical, a phenylethyl radical or furyl radical.

It has been discovered that these new compounds have a bacteriocidal or bacteriostatic activity which is extremely high and comparable with the best of the known sulfa drugs. The compounds of the invention are active, for example, against streptococci, enterococci, and other pathogens of infectious diseases. The new compounds may also be used as dyes or as intermediates.

The new p-quinone diimides may be obtained by reacting a 1-4-benzoquinone containing two free carbonyl groups with an amino-guanidine, containing a free hydrazine group to form N-guanido-p-quinonimide still containing a free carbonyl group and reacting this monoimide with a hydrazine derivative of thiocarbonic acid, containing a free hydrazine group such as a thiosemicarbazide to form the diimide in accordance with the invention.

The sequence of the reaction may, of course, also be reversed with the quinone first being reacted with the hydrazine derivative of thiocarbonic acid and thereafter with the amino-quanidine.

The reaction is preferably effected, using 1 mol of 1-4 benzoquinone, 1 mol each of amino-guanidine and the hydrazine derivative of thiocarbonic acid. The free carbonyl groups of the starting p-quinone react with the hydrazine groups of the other reactants by splitting off water in a condensation reaction.

The reaction starting with 1,4-benzoquinone, which is first reacted with an unsubstituted amino-guanidine and thereafter with an unsubstituted thiosemicarbazide to form N-guanido-N'-thioureido may be represented as follows:

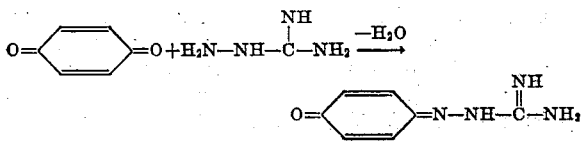

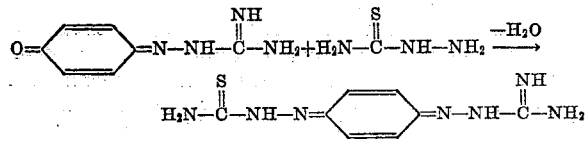

The starting amino-guanidine may be either guanyl hydrazine or 2-hydrazino-2-imidazoline.

Those amino-guanidines are known and their production has been described in the literature. They may be prepared by the adidtion of hydrazine to cyanamide; by desulfurization of thioureas in the presence of hydrazines; or by the reaction of isothioureas with hydrazine. The corresponding nitro guanidines may be converted to amino-guanidines by reduction. For example, 2-hydrazino-2-imidazoline, may be produced by reacting hydrazine and 2-ethyl-mercapto-2-imidazoline as follows:

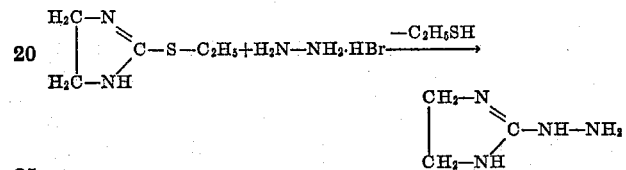

The hydrazine derivatives of thiocarbonic acid also used as a starting reactant in accordance with the invention, may be unsubstituted or substituted. The starting hydrazine derivatives, thus for example, may be alkyl substituted such as by a methyl, ethyl, propyl or isopropyl group or they may be substituted by a benzyl, phenylethyl or furyl radical, but it is necessary that these starting hydrazine derivatives of thiocarbonic acid contain a free hydrazine group bound to the carbonyl group.

In general, the condensation, in accordance with the invention, is a two stage process. The sequence of the condensation is generally of no importance. In many cases, however, it is advisable to first react the starting quinone with the amino-guanidine to form the N-guanido-p-quinonemonoimide and thereafter react this product with the second hydrazine component. This sequence is preferable due to the fact that some hydrazine derivatives have a greater reducing and thus, decomposing effect on the quinones than on the N-guanido-p-quinonemonoimides. In addition, the salts of the N-guanido-p-quinonemonoimides are often water soluble so that the further reaction step may be effected in aqueous solution.

Though it is preferable to isolate the p-quinonemonoimide formed by the first stage of the reaction prior to the condensation with the second hydrazine component, it is possible to produce the quinonediimides in accordance with the invention in good yields without this intermediate isolation.

The reaction with the amino-guanidines and/or the hydrazine derivatives of the thiocarbonic acids may be effected in an aqueous, aqueous-alcoholic or alcoholic solution. It is also possible, however, to use other organic solvents such as glycols, tetrahydrofuran or dimethylformamide.

The reaction may be effected at a temperature ranging between about 0° C. and 100° C. and preferably 40° C. to 70° C. with, in general, a lower temperature being employed for the first condensation than for the second. The reaction may be effected with the addition of an acid catalyst such as a mineral acid. Nitric acid has proven particularly suitable for this purpose since it acts simultaneously as a mild oxidation agent and thus prevents the quinone derivative from being reduced as, for example, by the thiosemicarbazide when the same is used in the second stage of the condensation.

It may also be mentioned that a displacement reaction may be used for producing compounds in accordance with the invention. Thus, for example, upon prolonged heating of N,N'-diguanido-p-quinonediimide with thiosemicarbazide, a portion of the amino-guanidine is replaced by the thiosemicarbazide.

The new condensation products are for the most part obtained as salts, as for example nitrates. The free bases may be separated from these salts by reaction with weak alkalis as, for example, ammonia. New salts may in turn be prepared from these bases by reaction with other acids. The bases thus may be reacted with acid reacting therapeutically active compounds such as p-amino-salicyclic acid and certain of the sulfa drugs. The salts are, as a rule, colored yellow to orange, while the free bases have a dark color, i.e., yellowish brown to almost black such as cherry red, dark red, or brown and black. These compounds are often characterized by a high capacity for crystallization and crystallize into glistening leaflets, laminae or needles which often have a metallic luster.

The melting points of these compounds are relatively high, but not very characteristic since the compounds usually decompose at elevated temperatures.

It has further been found that treatment of the compounds, in accordance with the invention, with reducing agents such as zinc, hydrochloric acid, stannous chloride, sodium dithionite, etc., will reduce the compounds to the dihydro products and that these dihydro products exercise the same therapeutic properties as the above mentioned quinonediimides themselves. Organic reducing agents such as ascorbic acid are also suitable for this purpose.

In the first stage of the reaction as, for example, when the p-quinone is reacted with an amino-guanidine, in addition to the monoimides formed, which is reacted further with the other hydrazine component in accordance with the invention, symmetrical diimides are formed. The further stage of the reaction, i.e., the condensation with the second hydrazine component, may be effected without separation or after isolation of the monoimides as for example, by crystallization.

The compounds are administered in tablet form but favorable effects have also been obtained with the compounds in spray or powder form. They can be administered as the salts, free bases or reduction products. The compounds may be administered in their hydrated or their anhydrous form. The hydrate normally occurs upon recrystallization from a medium containing water while the anhydrous base is obtained upon recrystallization from an anhydrous medium. The anhydrous base has the identical melting point as the hydrate and has the identical activity when compared with the hydrate. The only difference is that the anhydrous base forms crystals which are violet brown, while those of the hydrate are copper-brown.

In addition to the above thioureido compound, it has been found that the ureido compound corresponding to N-guanido-N'-thioureido-quinonediimide is also highly effective as a pharmaceutical, showing a similar bactericidal and bacteriostatic activity. This compound is N-guanido-N'-ureido-p-quinonediimide and has the structural formula:

This ureido compound is formed in the identical manner as the corresponding thioureido compound except that in place of the thiosemicarbazide, semicarbazide is used.

In the same manner as the thioureido compound, this ureido compound may be used as such, or in the form of its salts or reduction compounds. The compound is administered in the same form and, as mentioned, shows a corresponding bactericidal or bacteriostatic activity.

The following examples are given by way of illustration and not limitation:

EXAMPLE 1

Twenty-two and seven tenths grams of N-guanido-p-benzoquinonimide nitrate

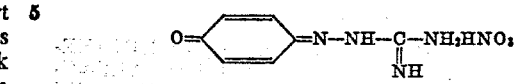

are dissolved in 250 cc. of hot water. A hot aqueous solution of 9.1 grams of thiosemicarbazide is added at about 60° C. and a mixture of 5 cc. of concentrated nitric acid and 10 cc. of water is slowly introduced in drops.

By stirring the mixture at 60° C. for about one hour, a yellow-brown precipitate is gradually formed, which is filtered with suction while hot and washed with some water. The filtrate contains the nitrate of the condensation product of one mol each of amino-guanidine, quinone and thiosemicarbazide. This compound is dissolved in about 1–1.2 liters of boiling water, separated from some adhering sulfur by filtration and the hot brown solution is reacted with about 50 cc. of a concentrated aqueous ammonia solution. Violet-brown, well crystallized plates, precipitate, which have a metallic luster after filtering with suction and drying. According to analysis, the new compound, N-guanido-N'-thioureido-p-quinonediimide, has the composition $C_8H_{11}N_7S \cdot H_2O$ corresponding to the structural formula

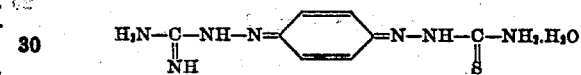

When slowly heated in a tube, the compound decomposes spontaneously at about 188° C.; when heating more rapidly, decomposition occurs at about 195° C.

The above described condensation may also be carried out in the presence of some concentrated hydrochloric acid.

N-guanido-N'-thioureido-quinonediimide can also be prepared from approximately molar quantities of acetone thiosemicarbazone and N-guanido-p-quinonimide nitrate in acetic acid (30 percent).

EXAMPLE 2

Nineteen grams of N-(2-imidazolinyl-amino)-p-quinonimide of the formula:

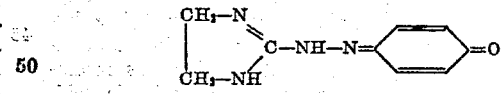

which is prepared from one mol of quinone and one mol of 2-hydrazino-imidazoline (obtainable from hydrazine and 2-ethylmercapto-2-imidazoline in accordance with the equation:

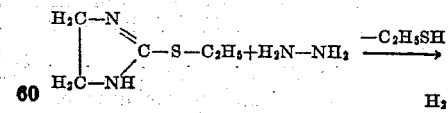

are dissolved in 320 cc. of water of 60° C. with the addition of 12.5 cc. of concentrated nitric acid. A solution of 13 grams of thiosemicarbazide in 75 cc. of hot water is added and the mixture is left standing without heating for one hour. Thereupon, the mixture is cooled with ice. The precipitated yellow crystals are suction filtered; they can be recrystallized from water. The free base is obtained by dissolving the compound in hot water and reacting it with excess aqueous ammonia solution. A red-brown compound immediately crystallizes. Melting point 192–195° C. The compound has the composition $C_{10}H_{13}N_7S$ and is N-(2-imidazolinyl-amino)-N'-thioureido-p-quinonediimide:

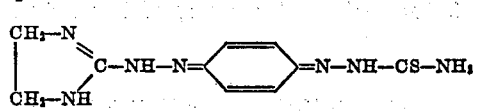

EXAMPLE 3

A solution of 13.1 grams of methylthiosemicarbazide, $H_2N-NH-CS-NH-CH_3$, in 50 cc. of hot water is introduced into a solution of 22.7 grams of N-guanido-p-quinonimide nitrate in 250 cc. of hot water. Thirty cc. of an aqueous solution containing 7 cc. of pure nitric acid is gradually added in drops. After about 15 minutes, yellow crystals, which are slightly soluble in water, precipitate. The temperature is kept at about 40° C. and the reaction product filtered with suction after some time. The compound washed with water is suspended in about 200 cc. of cold water and intimately mixed with 50 cc. of ammonia. The free base N-(methyl-thioureido)-N'-guanido-p-quinonediimide having the formula:

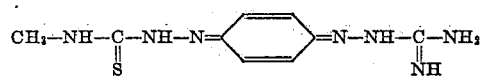

is obtained as a red-brown crystal mass. It is purified by recrystallizing from alcohol, red-brown glistening crystals being obtained. The wet base can also be dissolved in acetone and precipitated with about 1½ times its volume of toluene. The compound crystallizes, when thus purified, in a rather light, almost flesh colored form. It melts with decomposition at 198° C.

In similar fashion, many other thiosemicarbazides substituted in 4-position (obtainable from the corresponding isothiocyanates and hydrazine) can be reacted with N-guanido-p-quinonimide nitrates. Some of the products thus obtained (including those of Examples 1 and 3 hereinbefore) are indicated in the list below.

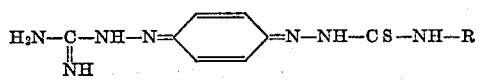

| R= | M.P. of thiosemi-carbazide used, degrees | M.P. of condensation products | recrystallized from |
|---|---|---|---|
| —H | 181–183 | 195° decompos. | dimethylformamide-H₂O. |
| —CH₃ | 138–140 | 198° decompos. | H₂O. |
| —C₂H₅ | 82– 84 | 202° decompos. | dimethylformamide-H₂O. |
| —CH₂—CH₂—CH₃ | 60– 63 | 202° decompos. | C₂H₅OH. |
| —CH₂—CH₂—CH₂—CH₃ | 74– 75 | 192–194° decompos., darkens at 183°. | C₂H₅OH. |
| —CH₂—CH(CH₃)₂ | 74 | 202–204° decompos. | C₂H₅OH. |
| —C(CH₃)₃ | 138–139 | 147–150° decompos. | CH₃OH+H₂O. |

EXAMPLE 4

Twelve grams of sodium dithionite, $Na_2S_2O_4$, are dissolved in 100 cc. of water at 40° C. and 8 grams of N-guanido-N'-thioureido-p-quinonediimide obtained according to Example 1 are added in portions. After shaking for a short time, the product dissolves and decolorizes. The solution is filtered with some animal charcoal and stored at 0° C., whereupon the new compound precipitates in colorless crystals. The compound is preferably filtered with suction while passing nitrogen over it and dried under vacuum. This compound is the sulfurous acid salt of the dihydrocompound of the starting material N-guanido-N'-thiosemicarbazido-p-phenylenediamine sulfite of the formula:

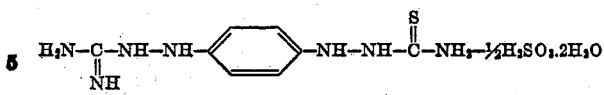

EXAMPLE 5

Ten grams of N-(methyl-thioureido)-N'-guanido-p-quinonediimide (see Example 3) are added to a solution of 15 grams of sodium dithionite in 250 cc. of water and the suspension is stirred for about 10 minutes. The brown base decolorizes without dissolving. The mixture is then diluted with ½ liter of water and boiled for a short time. An almost clear and colorless solution is thus obtained, which is filtered while hot and cooled. The reduction product crystallizes slowly and is suction filtered under oxygen free or at least substantially oxygen free conditions and dried under vacuum. The product can be purified by recrystallizing it from hot water. The yield amounts to almost 10 grams. The compound is N-guanido-N'-methylthioureide-p-phenylene diamine sulfite having the formula:

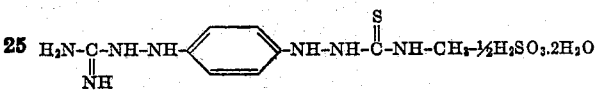

EXAMPLE 6

An intimate mixture is prepared from 1 part of N-guanido-N'-thioureido-p-quinonediimide (see Example 1) and 1 or 2 parts of ascorbic acid. The product thus obtained dissolves in cold water causing an orange-red coloration. On heating, the solutions decolorize under the reducing action of the ascorbic acid. The solutions are very valuable for medical use.

EXAMPLE 7

Two hundred and sixteen grams of p-benzoquinone are dissolved in 900 cc. of boiling alcohol and the solution is allowed to cool to 40° C., whereupon part of the quinone crystallizes. A weak nitric acid solution of 274 grams of amino-guanidine nitrate in 500 cc. of water is then slowly introduced; the temperature may rise up to 50° C. The reactants completely dissolve. Before the resulting N-guanido-p-quinonimide nitrate precipitates, a solution prepared from 182 grams of thiosemicarbazide in 1200 cc. of water of 60° C. is introduced while cooling to keep a temperature of 50° C. The temperature is then maintained at 45–50° C., for one hour. The condensation product described in Example 1, i.e., N-guanido-N'-thioureido-p-quinonediimide, separates in the form of its nitrate as a sandy yellow-brown precipitate which is filtered with suction. About 360 grams of the nitrate, decomposing at 207–209° C., are thus obtained. By dissolving the nitrate in a mixture of 2 parts of dimethylformamide and 1 part of water at 100° C., and introducing ammonia solution and water, the free base is obtained in a finely crystallized form.

EXAMPLE 8

A solution of 27 grams of p-benzoquinone in 250 cc. of boiling alcohol is cooled to 40° C. A solution of 45 grams of 2-hydrazino-2-imidazoline-hydrobromide (see Example 2) in 200 cc. of water and 17.5 cc. of concentrated nitric acid are added, the temperature being lowered to 24° C. by cooling. After some minutes, a solution of 33 grams of methyl-thiosemicarbazide (see Example 3) in 200 cc. of hot water is introduced; the temperature is kept at 40° C. After some hours, the solution is cooled with ice whereby the new condensation product is obtained in the form of a precipitate which is difficult to filter. By grinding, the precipitate in a dilute ammonia solution, the free base is obtained, which can be purified by dissolving in hot alcohol and mixing with water. The free base, N-(2-imidazolinyl-amino)-N'-methyl-thioureido)-p-quinonediimide, melts at 126–130° C. and has the composition $C_{11}H_{15}N_7S$ corresponding to the structural formula:

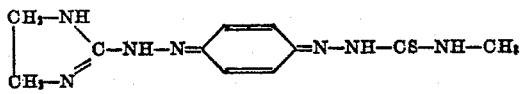

EXAMPLE 9

One hundred grams of N-guanido-N'-thioureido-p-quinonediimide (see Example 7) is taken up in 1 liter of a boiling dilute propionic acid (100 cc. of pure propionic acid diluted with 1000 cc. of water). The base dissolves. On cooling, the propionate crystallizes out in lustrous yellow needles, which are filtered off, washed with water, and cautiously dried.

The acetate and other fatty acid salts of N-guanido-N'-thioureido-p-quinonediimide can be prepared in similar fashion.

EXAMPLE 10

Eighteen and one tenth grams of 4-amino-2-hydroxybenzoic acid are dissolved at 35° C. in 500 cc. of methanol. To this solution is added 25.7 grams of N-guanido-N'-thioureido-p-quinonediimide (see Example 7) in finely powdered form. The base very rapidly dissolves. After some standing, the salt from the two components precipitates in reddish-brown crystals, and 12 hours later, it is isolated by suction-filtration. It is then washed with ether and cautiously dried. Yield: 33 grams. In the light, the salt darkens; it melts at 160° C. The salicylate, melting at 168° C., can be obtained by an analogous procedure.

EXAMPLE 11

10 gm. of the condensate obtained according to Example 3 from N-guanido-p-quinoneimide and methyl thiosemicarbazide is added to a solution of 15 gm. sodium dithionite in 250 cc. of water, and the suspension resulting is stirred for about 10 minutes. The brown base is now decolorized without dissolving. The charge is subsequently diluted with 500 cc. of water and boiled. There results a nearly clear and colorless solution, which is filtered hot and then cooled. The reduction product slowly crystallizes and is filtered off by suction, in the absence of oxygen if possible, and dried in vacuo. It can be purified by recrystallization from hot water. The yield approximates 10 gm.

EXAMPLE 12

An intimate mixture is prepared of 1 part N-guanido-N'-thioureido-p-quinonediimide

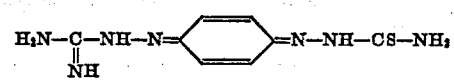

with 1 or 2 parts of ascorbic acid. The resultant product dissolves in cold water with orange-yellow color. On heating the solution becomes decolorized through reducing action of the ascorbic acid on the quinone derivative. Such solutions are highly suitable for medical purposes.

EXAMPLE 13

18.1 gm. of 4-amino-2-hydroxybenzoic acid is dissolved at 35° C. in 500 cc. of methanol. To this solution is added 25.7 gm. of N-guanido-N'-thioureido-p-quinonediimide

in finely powdered form. The base very rapidly dissolves. After some standing the salt from the two components precipitates in reddish-brown crystals, and 12 hours later it is isolated by suction-filtration. It is then washed with ether and cautiously dried. Yield: 33 gm. In the light the salt darkens; it melts at 160°. The salicylate, melting at 168°, can be obtained by an analogous procedure.

EXAMPLE 14

Sixteen and five tenths grams of N-ureido-p-quinonimide are dissolved with boiling in a mixture of 250 cc. of methanol and 100 cc. of water. At 50° C. an aqueous solution of 14 grams aminoguanidine nitrate in 40 cc. of water is added to the clear solution. This temperature is maintained for 90 minutes, and the resultant yellow precipitate is filtered off by suction, and is dissolved in 1 liter of water. Addition of ammonia yields the free N-guanido-N'-ureido-p-quinonediimide of the formula

The base swells without actually melting when heated in a melting point apparatus to 235–240° C.

The same compound can be obtained by combining at 45° C. in aqueous solutions of 22.7 grams of N-guanido-p-quinonimide nitrate (in 250 cc. of water) and 12 grams of semicarbazide hydrochloride (in 50 cc. of water) and stirring the mixture at this temperature for 1½ hours. The N-ureido-N'-guanido-p-quinondiimide nitrate precipitates as a yellow, slightly gelatinous mass, which is worked up in the manner described above.

The activity of N-guanido-N'-thioureido-p-quinonediimide

showed very high inhibitory values with respect to the various streptococcus, pneumococcus and enterococcus strains. A strong inhibitory effect is also exerted against anerobes. These inhibitory values far surpass those of the common sulfonamides. The values found in vitro are summarized in Table I.

Table I
INHIBITORY VALUES OF N-GUANIDO-N'-THIOUREIDO-p-QUINONEDIIMIDE IN VITRO

| | |
|---|---|
| β-Hemolytic streptococci of serological group A | 1:10 million. |
| β-Hemolytic streptococci of serological group B | 1:100,000. |
| Enterococcus strain XIII | 1:1 million. |
| Enterococcus strain XIV | 1:1 million. |
| Enterococcus strain 238 | 1:1 million. |
| Streptococcus viridans | 1:8 million. |
| Pneumococci type I | 1:1 million. |
| Pneumococci type II | 1:1 million. |
| Pneumococci type III | 1:1 million. |
| Streptococcus equi | 1:50 million. |
| Pacillus paraanthracis | 1:100,000. |
| Fraenkel's bacillus of gas gangrene | 1:100,000. |

Very good curative results can also be achieved with the N-guanido-N'-thioureido-p-quinonediimide in infected mice and rats. The effects of this compound were compared with those of two popularly employed sulfonamides and penicillin.

Mice infected with β-hemolytic streptococci of group A were treated 3 times, i.e., 1, 24 and 48 hours after infection. The dosage administered to groups of 2 animals was 0.2, 0.3, 0.5, 0.8, 1.00 cc. of a 1% product subcutaneously or orally.

Table II

| | No. of animals | Survivors 24 hrs. after the infection | Survivors 48 hrs. after the infection |
|---|---|---|---|
| Controls | 20 | 0 | 0 |
| Penicillin: | | | |
|   1 cc.=100 U. s.c. | 10 | 3 | 1}9 |
|   1 cc.=1,000 U. s.c. | 10 | 10 | 8} |
| Sulfapyrimidine— | | | |
|   s.c. | 10 | 9 | 6}13 |
|   Orally | 10 | 10 | 7} |
| Sulfamethylpyrimidine— | | | |
|   s.c. | 10 | 10 | 8}15 |
|   Orally | 10 | 10 | 7} |
| N-guanido-N'-thioureido-p-quinonediimide: | | | |
|   s.c. | 10 | 10 | 10}20 |
|   Orally | 10 | 10 | 10} |

Another group of mice were infected intraperitoneally with enterococcus strain XIII. The mice were treated one hour after infection. Dosage for groups of two animals: 0.2, 0.3, 0.5, 0.8, 1.0 cc. of a 1% product subcutaneously or orally. The results are shown in the following table:

Table III

| | No. of animals | Survivors 24 hrs. after the infection | Survivors 48 hrs. after the infection | Survivors 1 week after the infection |
|---|---|---|---|---|
| Controls | 20 | 0 | 0 | 0 |
| Penicillin: | | | | |
|   1 cc.=100 U. | 10 | 3 | 0 | 0}0 |
|   1 cc.=1,000 U. | 10 | 9 | 0 | 0} |
| Sulfamethylpyrimidine— | | | | |
|   1% s.c. | 10 | 1 | 0 | 0}1 |
|   1% orally | 10 | 1 | 1 | 1} |
| Sulfonamide combination product— | | | | |
|   1% s.c. | 10 | 0 | 0 | 0}1 |
|   1% orally | 10 | 3 | 1 | 1} |
| N-quanido-N'-thioureido-p-quinonediimide: | | | | |
|   1% s.c. | 10 | 9 | 3 | 3}8 |
|   1% orally | 10 | 10 | 10 | 5} |

Mice were intraperitoneally infected with *Streptococcus viridans* strain No. V. They were treated once an hour after infection. Dosage per two animals in the concentrations indicated of 0.2, 0.3, 0.5, 0.8, 1.0 cc.

Table IV

| | No. of animals | Survivors 24 hrs. after the infection | Survivors 48 hrs. after the infection |
|---|---|---|---|
| Controls | 20 | 0 | 0 |
| Penicillin dissolved in water: 1 cc.=1000 U. | 10 | 7 | 4 |
| Sulfapyrimidine: | | | |
|   1% s.c. | 10 | 1 | 0 |
|   1% orally | 10 | 1 | 1 |
| Sulfonamide combination product: | | | |
|   1% s.c. | 10 | 2 | 2 |
|   1% orally | 10 | 1 | 1 |
| N-guanido-N'-thioureido-p-quinonediimide: | | | |
|   1% s.c. | 10 | 8 | 6 |
|   1% orally | 10 | 8 | 8 |

N-guanido-N'-thioureido-p-quinonediimide has proved most effective in clinical trials. It has given convincing proof of its therapeutic efficacy in the various forms of tonsillitis, stomatitis and gingivitis; it has also proved useful in the postoperative treatment of tonsillectomies and tooth extractions. Additionally, it has been used successfully in the treatment of pharyngitides and laryngitides.

In human subjects, the preparation is generally employed in tablets of 10 mg. active substance each. The dosage pattern followed is usually 4–5 tables daily, to be dissolved slowly in the mouth.

The following is a survey of 62 cases and the results employing the N-guanido-N'-thioureido-p-quinonediimide in accordance with the foregoing dosage schedule. Local and general tolerance for the tablets in every case was very good.

| Diagnosis | A in 24 hrs. | B in 48 hrs. | C in 72 hrs. | D persisting symptoms |
|---|---|---|---|---|
| 1. Pharyngitis | 10 | 6 | | |
| 2. Tonsillitis | 9 | 25 | 6 | |
| 3. Stomatitis | | 2 | | |
| 4. Tonsillectomy | | 2 | | |

In summary it may be said that the quinone condensation products herein described represents new compounds with valuable bacteriostatic properties. The activity of these compounds against certain bacterial pathogens, particularly hemolytic streptococci of group A, *Viridans streptococci,* pneumococci and enterococci is particularly strong. The mechanism of action of these thiosemicarbazone derivatives seem to be a complex one which is not restricted to the purely bacteriostatic characteristics of the product.

The compounds of the other examples show comparable activity.

We claim:

1. A member selected from the group consisting of N-guanido-N'-thioureido-p-quinonediimide of the structural formula:

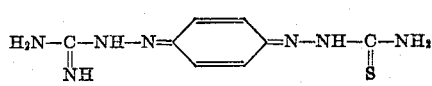

and salts thereof with an acid selected from the group consisting of acetic, propionic, salicylic, 2-hydroxy-4-amino benzoic, sulfurous, and nitric acid and, the reduction product thereof having the quinonoid structure of the quinonediimide converted to a benzenoid structure and having two hydrogen atoms added to the two imide bonds in the 1 and 4 positions.

2. N-guanido-N'-thioureido-p-quinonediimide of the structural formula:

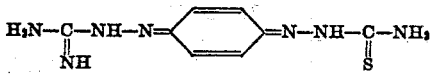

3. p-Phenylene diamine of the structural formula:

4. The hydrate of N-guanido-N'-thioureido-p-quinonediimide of the structural formula:

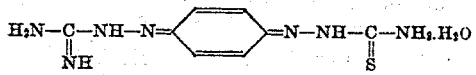

5. N-guanido-N'-thioureido-p-phenylene diamine in the form of its sulfurous acid salt.

References Cited in the file of this patent

Borsche, Annalen de chemie, vol. 334, pp. 143–200 (1904).

Petersen et al., Chem. Abstracts, vol. 48, col. 10925 (1954).

UNITED STATES PATENT OFFICE
CERTIFICATE OF CORRECTION

Patent No. 2,938,041                        May 24, 1960

Siegfried Petersen et al.

It is hereby certified that error appears in the above numbered patent requiring correction and that the said Letters Patent should read as corrected below.

In the grant (only), line 2, address of second inventor, for "Wuppertal-Eberfeld, Germany" read -- Wuppertal-Elberfeld, Germany --; in the printed specification, column 2, line 9, for "Those" read -- These --; line 11, for "adidtion" read -- addition --; column 3, line 11, for "salicyclic" read -- salicylic --; column 8, line 59, for "quinondiimide" read -- quinonediimide --; column 9, line 17, for "Pacillus", in italics, read -- Bacillus -- in italics; line 70, Table III, for "N-quanido" read -- N-guanido --; column 10, line 32, for "tables" read -- tablets --.

Signed and sealed this 1st day of November 1960.

(SEAL)
Attest:

KARL H. AXLINE                      ROBERT C. WATSON
Attesting Officer               Commissioner of Patents